United States Patent
Vasey

(10) Patent No.: US 7,380,201 B2
(45) Date of Patent: May 27, 2008

(54) CHECKING MISSING TRANSACTION VALUES IN GENERATED DOCUMENT

(75) Inventor: Philip E. Vasey, Histon (GB)

(73) Assignee: Business Integrity Limited (GB)

( * ) Notice: Subject to any disclaimer, the term of this patent is extended or adjusted under 35 U.S.C. 154(b) by 259 days.

(21) Appl. No.: 10/933,252

(22) Filed: Sep. 3, 2004

(65) Prior Publication Data

US 2005/0050445 A1   Mar. 3, 2005

Related U.S. Application Data

(60) Provisional application No. 60/499,386, filed on Sep. 3, 2003.

(51) Int. Cl.
*G06F 17/00* (2006.01)
(52) U.S. Cl. ............ 715/200; 715/255; 715/209
(58) Field of Classification Search ......... 715/513, 715/500, 234, 200, 209, 255, 517, 505, 530; 706/46; 707/100
See application file for complete search history.

(56) References Cited

U.S. PATENT DOCUMENTS 5,893,914 A * 4/1999 Clapp .................. 715/507

2003/0172343 A1* 9/2003 Leymaster et al. ......... 715/500
2007/0061717 A1* 3/2007 Cragun et al. ............. 715/530

FOREIGN PATENT DOCUMENTS

EP          1329817 A1    7/2003
WO      WO 03/061474     7/2003

* cited by examiner

*Primary Examiner*—Thu Huynh
(74) *Attorney, Agent, or Firm*—Anderson Gorecki & Manaras LLP

(57) ABSTRACT

The invention provides a document generation system for generating a customized document using content elements selected by rules operating on input information, the operating information comprising transaction values. The system comprises at least one computer having a document generation program stored thereon, means to associate further rules with the transaction values, and means to evaluate said further rules to produce an indication of the relevance of the presence or absence of the transaction values in a fully or partially customized generated document. The effect of the transaction values is represented by means of a mark-up.

22 Claims, 6 Drawing Sheets

| Highlight | Prompt | Input | Defer | Unsure |
|---|---|---|---|---|
| ☐ | Select the Software type | ☑ Packaged Only<br>☐ Bespoke | ☐ | ☐ |
| ■ |  | ○<br>● | ■ | ■ |
| ☑ | Select Invoice Office | ○ London<br>○ New York<br>⦿ Chicago<br>○ Tokyo | ☐ | ☑ |

Figure 6 ns of the invention may be carried out;
CHECKING MISSING TRANSACTION VALUES IN GENERATED DOCUMENT

RELATED US APPLICATIONS

This application claims the benefit of U.S. Provisional Application No. 60/499,386, filed 3 Sep. 2003.

FIELD OF THE INVENTION

The present invention relates to the automated creation of documents, and in particular, to the use of specific mark-up rules within such a document.

BACKGROUND OF THE INVENTION

It is well known to generate customised documents, either manually or using an automated system, from precedents or templates.

If this is done manually, then a printed standard form or other precedent, containing blank spaces for particular relevant information, will be filled in and edited on each specific occasion it is used. Instructions may be included in the standard document to help the user insert the correct or appropriate information.

If this is done using an automated system, then an electronically stored document or template will be used, in conjunction with various logical rules and other criteria, to prompt the user for the correct information and to assemble a customised document by associating various relevant rules with variables within the template. For example, the Hot-Docs® system uses a library of Form Templates, which store both static and dynamic areas of text, that are initially customised by the user, in conjunction with a questionnaire to produce a completed customised document. Necessary information relevant to the dynamic text areas may either be input directly by a user, or gathered from an Answer File. The Answer File contains information which is repeatedly used in the same or similar customised document. Various logical rules and calculation criteria are used to associate information with the template to produce a final customised document. This document may then be edited, printed or stored.

Other known automated systems include that described in WO01/04772. In this system, a server computer runs a document generation program and is capable of communicating with local or remote client computers over a local area network (LAN) or a wide area network (WAN), such as the internet. A standard document, comprising various items of known information and associated logical rules, is first translated into a form suitable for processing by the document generation program. When instructed to generate a customised document, the server first generates one or more web pages which are sent to client computers for user input of the further information required to evaluate the logical rules. Users may then submit the further information to the server. Once all the required further information has been captured, the server generates a customised document on the basis of the standard document and received further information.

For a fully customised document, which contains no conditional text as all of the information required to be complete, there is no need to provide any form of temporary document which indicates where information needs to be provided. However, it is not always possible for the user to provide enough information to allow the document generation program to generate a fully customised document. The document generation program therefore needs to find a way in which this missing information can be included in a partially customised document. For example, there may be various transaction values, such as currency values, missing, or there may be insufficient information to resolve all of the conditional clauses within the template. Therefore, the partially customised document must have the same information content as the template it is generated from, as well as the ability to cope with and indicate to the user the effect of, missing transaction values and conditional information.

WO03/061474 describes a system for the generation of partially customised documents. Although the system provides a mark up of the information which is not included in the partially customised document, such as conditional clauses, there is no facility to indicate missing or indefinite transaction values, and their effect on the final, fully customised document.

There therefore exists a need to be able to produce a partially customised document contains information regarding missing transaction values rather than merely including the variables given in the template. The mark-up used also needs to be flexible, to accommodate a particular user's needs.

SUMMARY OF INVENTION

The invention aims to address the problems of the prior art described above. The invention provides a document generation system for generating a customised document using content elements selected by rules operating on input information, the operating information comprising transaction values. The system comprises at least one computer having a document generation program stored thereon, means to associate further rules with the transaction values, and means to evaluate said further rules to produce an indication of the relevance of the presence or absence of the transaction values in a fully or partially customised generated document.

The effect of the transaction values is represented by means of a mark-up. The mark-up may be user-defined, such as by selecting rules from a pre-determined menu.

The user may select particular variables, using checkboxes on a web form, which are shown in the mark-up of the generated document. In this case, only the rules relating to the selected variables are evaluated.

The invention also provides a computer implemented method of document generation, wherein rules associated with the content elements are evaluated to produce a partially or fully customised document, and specific highlight rules are evaluated to highlight the relevance of the presence or absence of transaction values on the partially or fully customised document. Such a computer implemented method may be implemented as a computer program product and stored on a computer readable medium.

The invention provides the advantages that the relevance of a particular variable within a document may be immediately seen by the user, and may be highlighted in a user-defined manner.

BRIEF DESCRIPTION OF THE DRAWINGS

The invention will now be described by way of example only, and with reference to the accompanying drawings in which:

FIG. 6 is an example of a web input form for use with embodiments of the invention.

DESCRIPTION OF PREFERRED EMBODIMENTS

The system in which embodiments of the present invention are implemented will now be briefly described. The system comprises one or more data processing means, which, where a plurality of processing means are used, are connected together using communication means. For example, client/server architecture may be used, with one of the data processing means functioning as a server, and others as clients. However, a single processing means may function as both server and client. Various configurations of client/server architecture are shown in FIGS. 1, 2 and 3.

Figure 1:
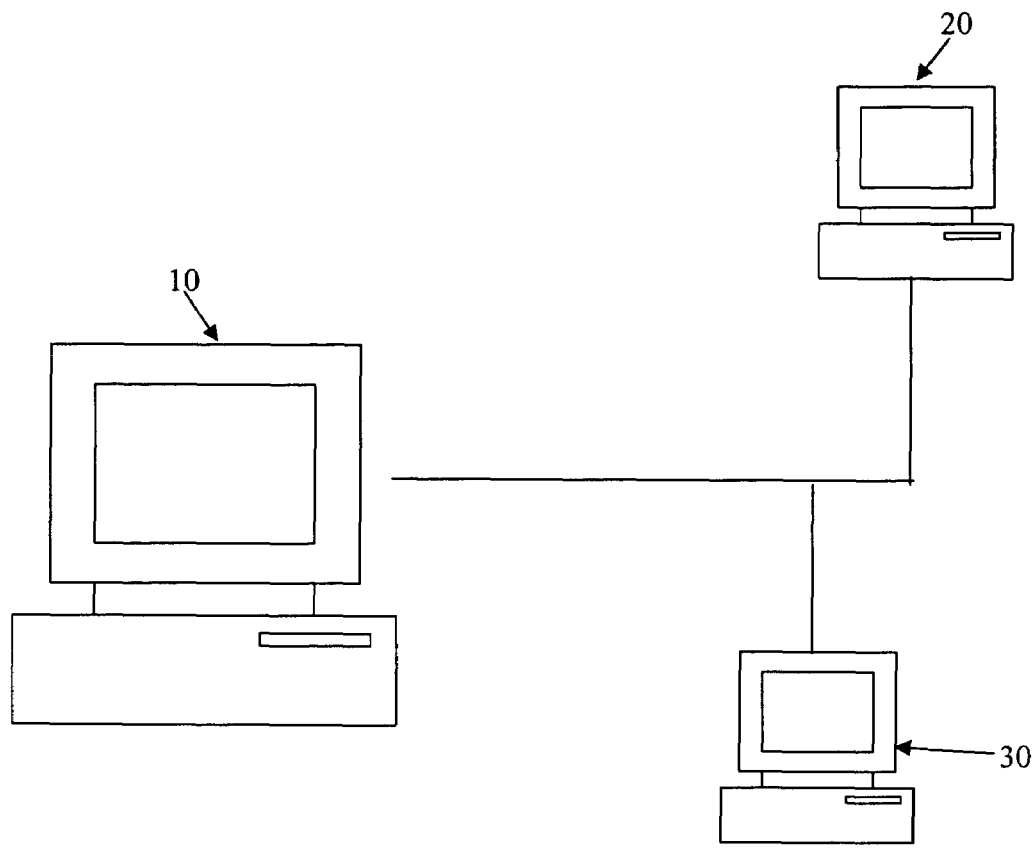
FIG. 1 illustrates a first network system in which embodiments of the invention may be carried out.

FIG. 1 shows a server computer 10 connected to two local client computers 20 and 22, connected by means of a local area network (LAN) 30, forming an intranet. Each computer 10, 20, 22, runs an operating system program, such as Microsoft Windows 2000 Professional™ and network programs such as Novell Netware™. The server computer 10 also runs a Web server application such as Microsoft Internet Information Server™, and each of the local client computers 20, 22 also run a browsing application such as Microsoft Internet Explorer™. The server 10 and local computers 20, 22 communicate using transmission control protocol/internet protocol (TCP/IP) and hypertext transfer protocol (HTTP), or another alternative language, such as XML. The invention is not limited to any particular hardware architecture. For example, the invention could be implemented as a stand alone computer such as, for example, a PC.

Figure 2:
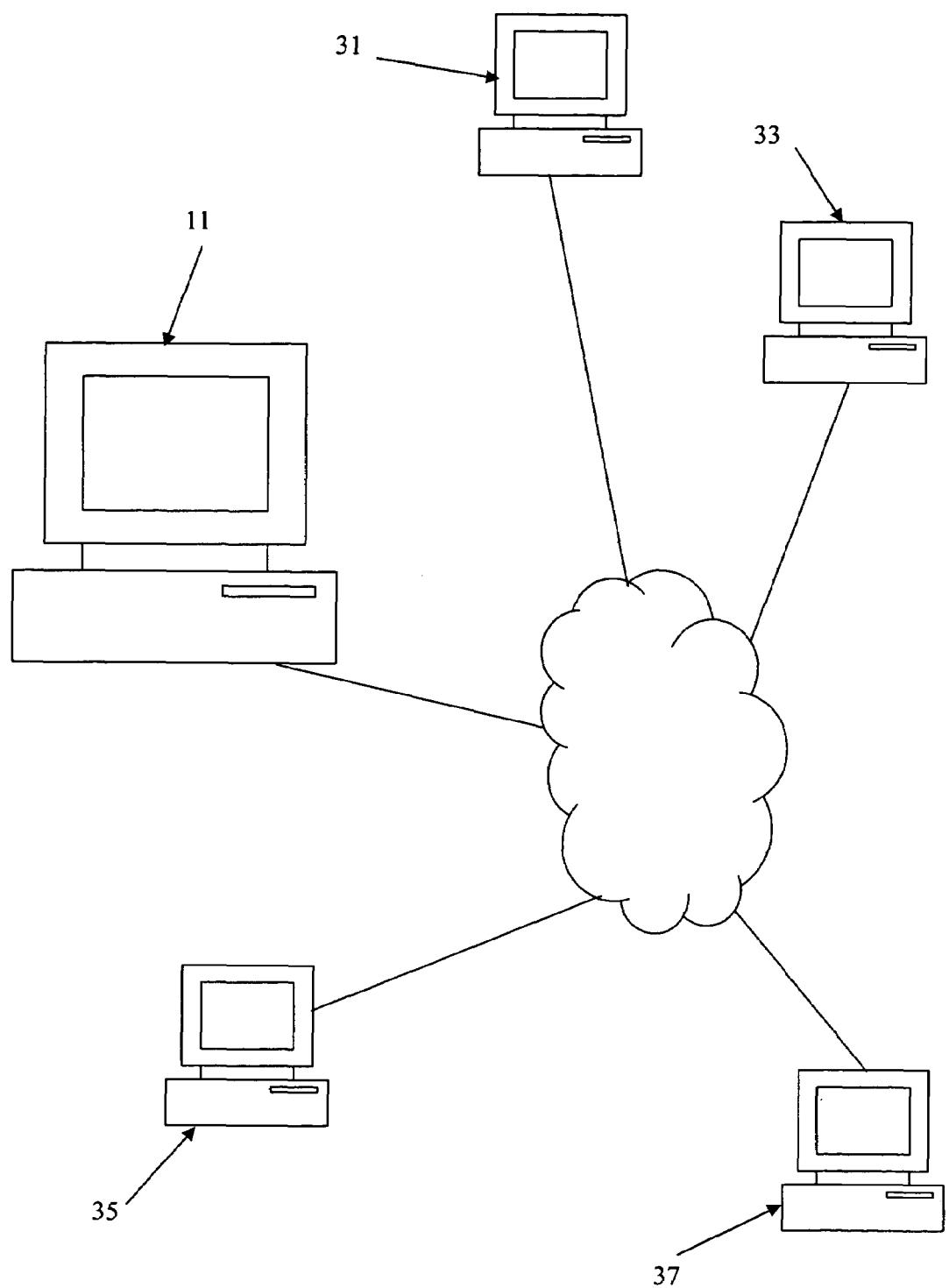
FIG. 2 illustrates a second network system in which embodiments of the invention may be carried out.

FIG. 2 shows a single server computer 11 connected to four client computers, 31, 33, 35 and 37, using a LAN, each of which runs the operating systems and browser applications mentioned above, and which communicate with the server computer 10 using TCP/IP and HTTP protocols.

Figure 3:
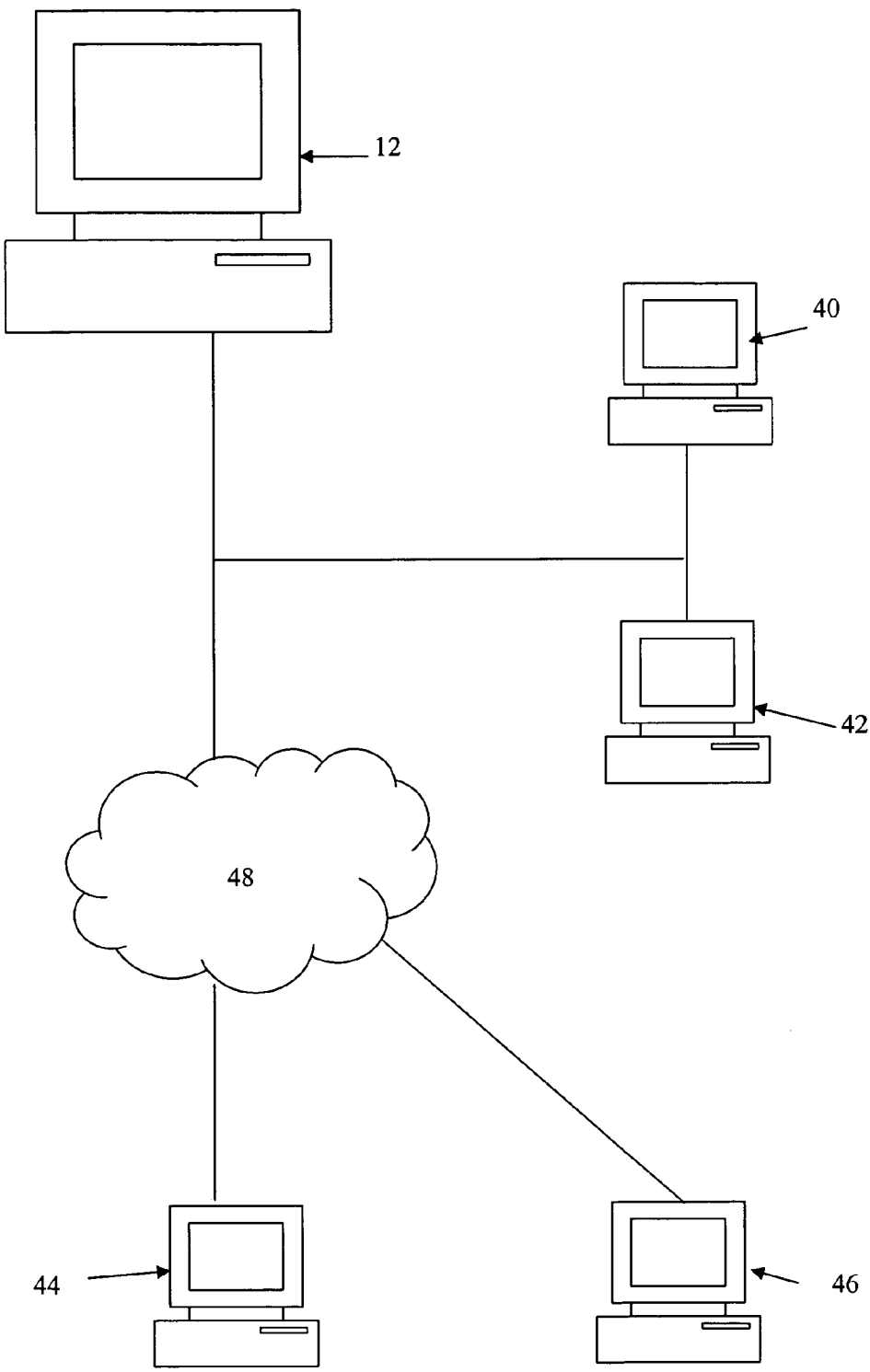
FIG. 3 illustrates a third network system in which embodiments of the invention may be carried out.

FIG. 3 shows a server computer 12 connected to two local client computers 40 and 42 using a LAN, and also connected to two remote client computers 44 and 46 through the internet 48. Each runs the operating and browser systems and browser systems mentioned above, and proxy servers and firewalls may be used to protect the intranet from unauthorised access from the internet. Again, communication within the intranet is via TCP/IP and HTTP protocols.

As FIG. 3 is the most general arrangement, embodiments of the invention will be described with respect to such a network.

One or more of the computer systems 12, 40, 42, 44 and 46 runs a word processing application such as Microsoft Word™, which is used to create document templates and may be used to view fully or partially customised documents generated by a document generation system. The document template comprises one or more content elements for possible use when generating a customised document and one or more associated rules for determining, on the basis of further information provided by a user, how to use the content elements (which may be conditional clauses or statements) when generating a customised document.

Server computer 12 also runs a document generation program, which, when provided with a template, generates one or more input forms to capture information from a user, the input forms being generated on the basis of rules contained in the template. The document generation program then generates a fully or partially customised documents on the instructions of a user. The document generation program may be run as a server program and is instructed to perform tasks by users of client browser applications.

To generate either a fully or partially customised document from a template, a user instructs the document generation program by sending URL GET or POST request from a client computer, 40, 42, 44 or 46, to the server 12. The document generation program then initiates a session with the client computer. The document generation program may generate one or more Web input forms based on the chosen template, which are passed via a Web server application to the client computer. This Web input form uses standard HTML (hyperlink mark-up language) features such as buttons, free-form entry boxes, tick boxes, pull-down menu list boxes, radio buttons and other graphical user interface (GUI) means for inputting information. The document generation program may generate multiple input forms for distributing to and capturing further information from the users of one or more further client computers 40, 42, 44 46. The document generation program may also produce multiple forms for capturing information from the user of a single client computer in several stages. However, in the following embodiments, it is assumed that only one user of a client computer is involved.

Figure 4:
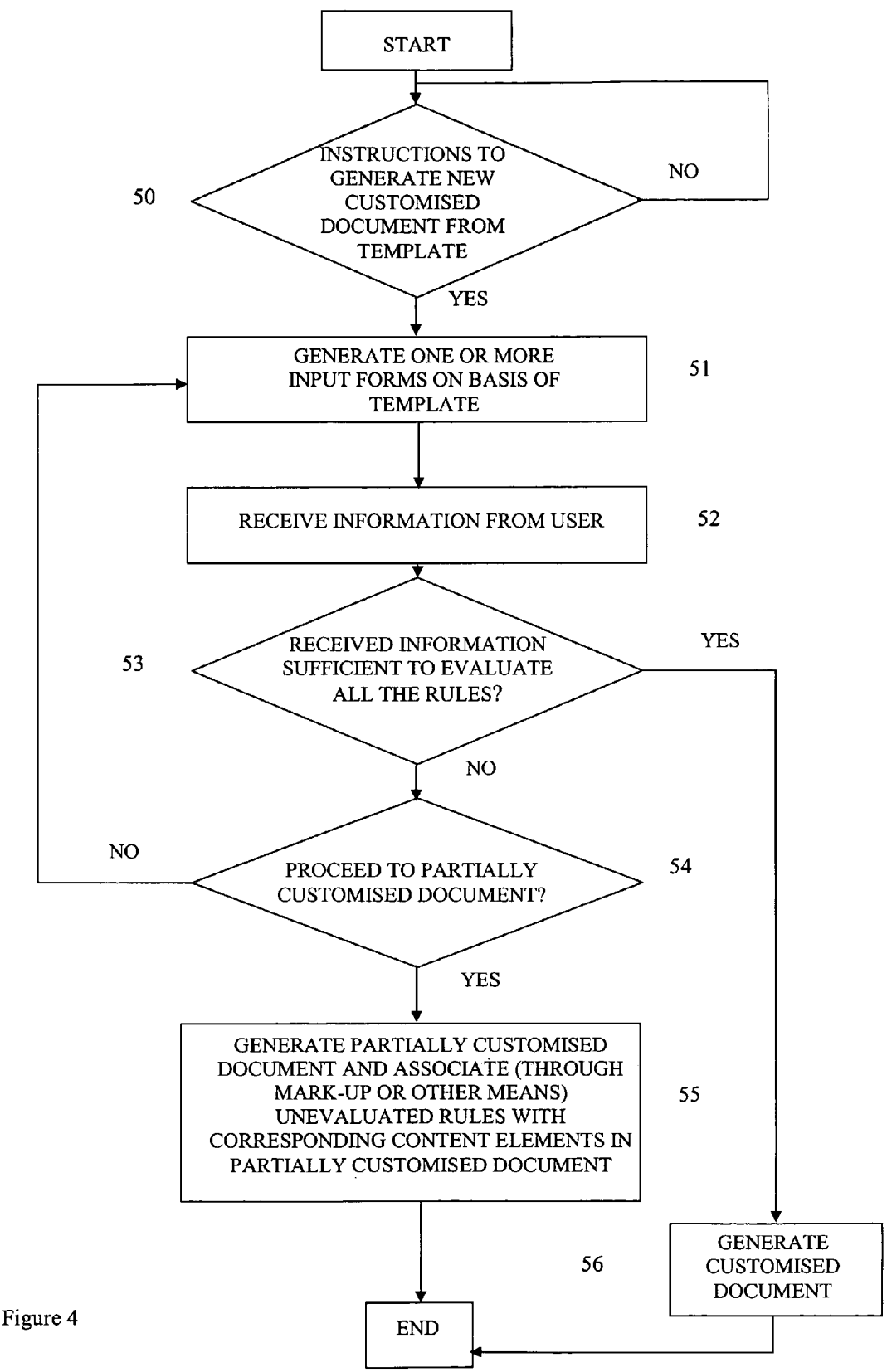
FIG. 4 is a flow diagram showing the stages in producing a customised document.

FIG. 4 is a flow diagram showing the process followed by the document generation program. At step 50, the document generation program waits for an instruction from the user to generate a new customised document from a template. On receiving such an instruction, the document generation program generates, at step 51, a first input form on the basis of the rules contained in the template. The user then enters information, using the input form, which is received by the document generation program at step 52. Then, at step 53, the document generation program determines whether the received information is sufficient to evaluate all the rules. If yes, the process continues to step 56 where the document generation program generates a customised document. If no, then the process continues to step 54, where the document generation program determines whether or not it should proceed to generate a partially customised document. If it should, then the process continues to step 55 where such a document is generated. If there is no request from the user to produce a partially customised document (for example, a tick box on the Web input form has been left blank), then the process returns to step 51, and generates further Web input forms for capturing further information from the user. This process is completed until sufficient information is captured to produce either a fully customised document, or a satisfactory partially customised document.

The partially customised document contains not only the content elements, the inclusion of which has been determined by the various rules within the template, but also the rules which have not been evaluated. Therefore, the partially customised document contains the same information content as the template, and also illustrates the effect of the remaining conditional statements on the final, fully customised document. The partially customised document will form the template of the fully customised document, when the document generation program next generates a form to capture the remaining information. The association between the content elements and rules which have not been evaluated in the partially customised document may be represented by means of a mark-up.

Figure 5:
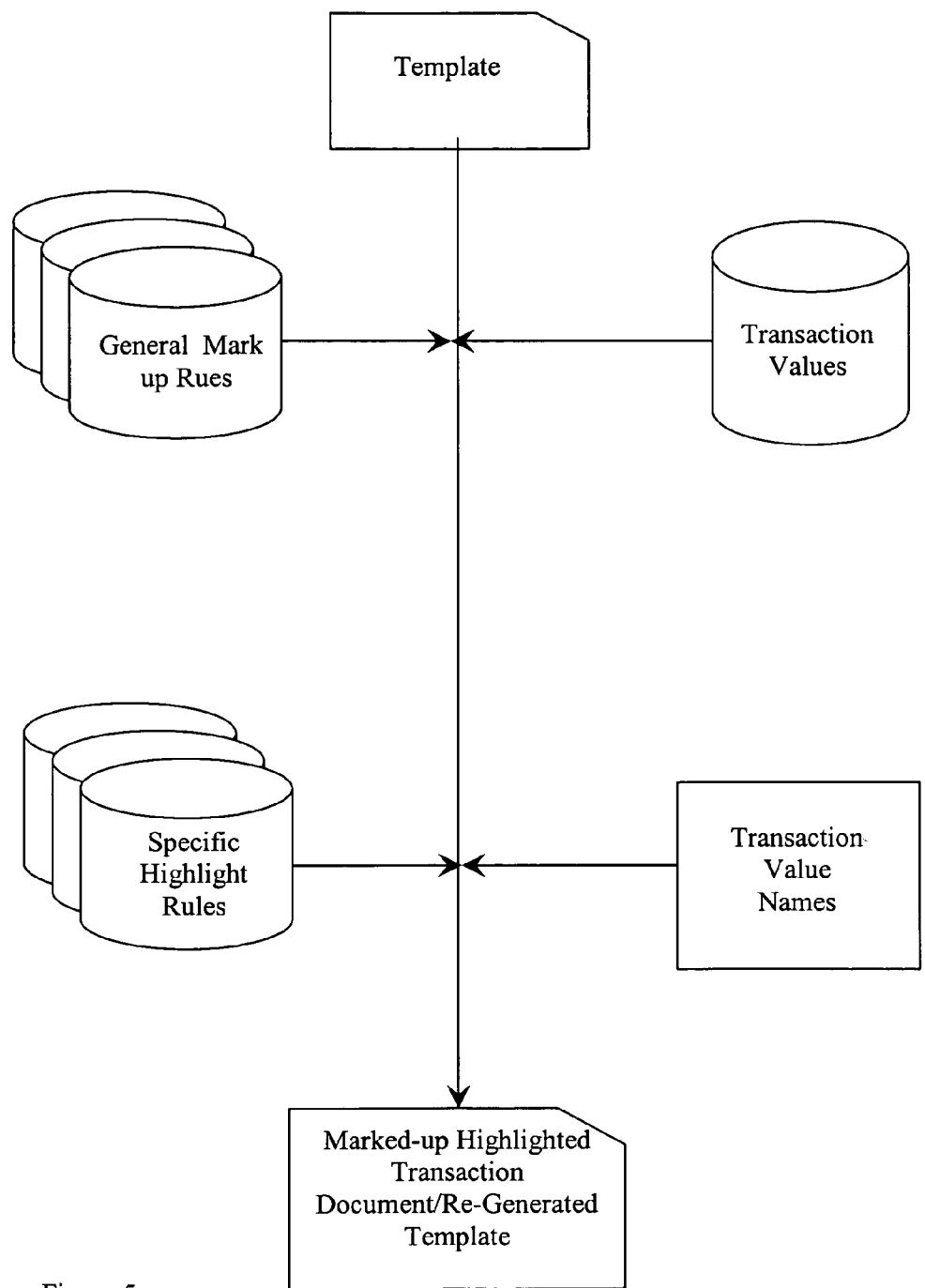
FIG. 5 is a schematic representation of how specific highlight rules relate to the template and generated document.

Embodiments of the present invention provide an enhanced mark-up scheme which indicates the relevance and effect of missing transaction elements. FIG. 4 is a schematic diagram of the relationship between the template, the transaction values and the customised document. FIG. 5 is a schematic illustration of how the mark up rules relate to the transaction values and a marked-up, partially customised document. The general highlight rules allow the document generation program to produce a partially customised document which is able to support missing or indefinite transaction values. The mark-up rules primarily govern what information is inserted when a transaction value is missing, what information is inserted when a transaction value is indefinite, and how conditional text is represented when its associated usage statement cannot be determined in any definite manner, either through missing or indefinite transaction values. The same style mark-up may also be shown in the template.

The specific highlight rules are related to the transaction value names, and may be used to highlight a single variable or groups of variables. The effect of the specific highlight rules will now be illustrated by considering the types of fully and partially customised documents which may be generated by the document generation program.

It is possible to generate different types of partially customised documents. For example, work-in-progress transaction documents, in which most, but not all of the transaction values are known, and which contains marked-up placeholders for missing or indefinite transaction values may be produced. Alternatively, sub-template documents may be produced. In these, some of the transaction values are known to have specific values, and therefore the sub-template only contains the portions of the original template which are relevant to these known values.

It is also possible to produce a fully re-generated template, for which no transaction values have been supplied, but marked up to show where values are missing and their effect on the customised document that the document generation program will eventually generate from the template. This re-generated template will have the same information content as the original template.

An example marked-up template could be marked-up with the following rules:
variables are marked-up with curly {} brackets;
calculations (involving transaction values) are marked up with {=}; and
conditional text is marked up with matching square [$^1_1$] brackets, where the superscript and subscript numerals relate to the corresponding usage statement.

The following clauses have been marked-up using these rules:

3. PACKAGED[$^1$ ONLY$_1$] [$^2$ and BESPOKE$_2$] SOFTWARE PRICING

The prices for the packaged Software [$^2$ and the modifications to [$^3$ and the maintenance of$_3$] the Software$_2$] are in {=InvoiceOffice.CurrencyName} ({=InvoiceOffice.CurrencySymbol}) and will be invoiced to the {Invoiceoffice} office.

4. JURISDICTION

This agreement is governed by the laws of [$^4$England and Wales$_4$] [$^5$the United States of America$_5$] [$^6$Japan$_6$].

The usage statements are defined as:
1 BespokeSoftware IS FALSE
2 BespokeSoftware IS TRUE
3 Maintenance IS TRUE
4 InvoiceOffice IS "London"
5 InvoiceOffice IS "New York" OR "Chicago"
6 InvoiceOffice IS "Tokyo"

In order for the rules associated with the content elements in the template above to be evaluated by the document generation program, the following look-up table will be needed:

| Office | Currency Name | Currency Symbol | Country |
|---|---|---|---|
| London | Pound Sterling | £ | United Kingdom |
| Tokyo | Yen | ¥ | Japan |
| New York | US Dollar | $ | USA |
| Chicago | US Dollar | $ | USA |

If these mark-up rules are extended, such that usage statements are included with the relevant conditional text of the content elements, it is possible to regenerate the template.

The additional mark-up rules are:
variables are marked up with <> brackets, which contain the name of the variable (this may be highlighted using a different font colour, for example, blue);
calculations are also marked-up with <> brackets containing the text of the calculation in italics (this may be in the same font colour as the variables); and
conditional text is marked-up with matching [] brackets with the usage statement following the leading bracket as a superscript (both brackets and text may be marked-up in a different font colour to the other marked-up features, for example, red).

This is illustrated below:

3. PACKAGED [$^{BespokeSoftware\ IS\ FALSE}$ ONLY] [$^{BespokeSoftware\ IS\ TRUE}$ and BESPOKE] SOFTWARE PRICING The prices for the packaged Software [$^{BespokeSoftware\ IS\ TRUE}$ and the modifications to [$^{Maintenance\ IS\ TRUE}$ and the maintenance of] the Software$_2$] are in <InvoiceOfice.CurrencyName> (<InvoiceOffice.CurrencySymbol>) and will be invoiced to the <InvoiceOffice> office.

4. JURISDICTION

This agreement is governed by the laws of [$^{InvoiceOffice\ IS\ "London"}$England and Wales] [$^{InvoiceOffice\ IS\ "New\ York"\ OR\ InvoiceOffice\ IS\ "Chicago"}$ the United States of America] [$^{InovoiceOffice\ IS\ "Tokyo"}$Japan$_6$].

Once the template has been marked-up, the specific mark-up rules can be evaluated by the document generation program to produce a re-generated template. These highlight rules allow the transaction values to be highlighted in various colours or font styles.

The following specific highlight rules may be used:
the first variable is single underlined;
the second variable is thick underlined;
the third variable is double underlined;
the fourth variable is single wavy underlined;
the fifth variable is double wavy underlined;
all other variables are dotted underlined;
the first usage statement is highlighted green;
the second usage statement is highlighted dark yellow;
the third usage statement is highlighted violet; and
all other usage statements are highlighted grey.

Of course, it is possible for the user to define other specific highlight rules, either by selecting from a menu of predetermined rules, or by creating their own within the template.

Once the document generation program evaluates all of the rules, including the specific highlight rules, the partially customised document produced is in the form of a re-generated template. However, it is advantageous from the users' point of view to be able to select specific variables, and to merely highlight the relevance and effect of these particular variables in the re-generated template. Furthermore, the user may wish to select that only the information provided the content elements which are relevant to the selected variable or variables is included in the re-generated template.

FIG. 6 shows an example of a web form for collecting information from the user. On the far left-hand side of the form, there are a series of check boxes. Clicking in these check boxes allows the user to select specific variables. These variables will then be highlighted in a re-generated master document, by the evaluation of the specific highlight rules by the document generation program, allowing the user to see the relevance and effect of the variables on the customised document.

Various modifications to the invention, which are within the scope of the appended claims, will be clear to those skilled in the art.

What is claimed is:

1. A document generation system for generating a customised document using content elements selected by rules operating on input information, the input information comprising transaction values, the system comprising:
   at least one computer having a document generation program stored thereon, wherein the document generation program is executed to:
   a) generate a partially customised document by evaluating the rules to select some of the content elements;
   b) associate mark-up rules with the transaction values; and
   c) evaluate the mark-up rules to produce an indication in the generated partially customised document of where the transaction values are missing and their effect on the generated partially customised document being produced by the document generation program,
   and wherein the effect of the transaction values is indicated by marking up the generated partially customised document to show:
      i) the name and location of a missing transaction variable;
      ii) calculations involving the missing transaction variable; and
      iii) conditional text having a usage statement that depends on the missing transaction value.

2. The document generation system of claim 1, wherein the at least one computer is part of a client server network, comprising at least one client computer and at least one server computer.

3. The document generation system of claim 2, wherein the at least one client computer and the at least one server computer communicate using a communication protocol.

4. The document generation system of claim 3, wherein the communication protocol is at least one of TCP/IP or XML.

5. The document generation system of claim 2, wherein the at least one computer is a server computer.

6. The document generation system of claim 2, wherein the at least one computer is a client computer.

7. The document generation system of claim 1, wherein the mark-up rules cause the transaction values to be highlighted in the generated document.

8. The document generation system of claim 7, wherein the transaction values maybe highlighted in various colours or font styles.

9. The document generation system of claim 1, wherein the mark-up rules are user defined.

10. The document generation system of claim 1, wherein the mark-up rules are selected from a pre-determined menu.

11. The document generation system of claim 1 further comprising means to allow a user to select one or more of the transaction values, and the document generation system is operable to indicate in the generated document where transaction values are missing and their effect on the document being produced by the document generation program, only for the selected transaction values.

12. The system of claim 1, wherein the mark up rules indicate the information to be inserted into the generated document when a transaction value is missing or indefinite, and the information to represent any conditional text.

13. The system of claim 1, wherein highlight rules are associated with transaction value names, the highlight rules specifying how to highlight a single variable or group of variables in the generated document.

14. The system of claim 13, wherein the highlight rules indicate different fonts or colours for different transaction value names.

15. A computer-implemented method of document generation using external data and received information, the method comprising:
   accessing a template comprising content elements and transaction values for use when generating a document;
   accessing data associated with the template, the data representing at least one rule for making at least one determination of the use of the content elements and transaction values, and at least one mark-up rule;
   receiving information enabling at least one determination to be made;
   generating a partially customised document on the basis of the received information; and
   evaluating the at least one mark-up rule to produce an indication in the generated partially customized document of where the transaction values are missing and their effect on the generated partially customized document being produced by the document generation program,
   wherein the effect of the transaction values is indicated by marking up the generated partially customized document to show:
   i) the name and location of a missing transaction variable;
   ii) calculations involving the missing transaction variable, and
   iii) conditional text having a usage statement that depends on the missing transaction value.

16. The method of claim 15, wherein the mark up rules indicate the information to be inserted into the generated document when a transaction value is missing or indefinite, and the information to represent any conditional text.

17. The method of claim 15, wherein highlight rules are associated with transaction value names, the highlight rules specifying how to highlight a single variable or group of variables in the generated document.

18. The method of claim 17, wherein the highlight rules indicate different fonts or colours for different transaction value names.

19. A computer program product comprising a computer readable medium having stored thereon program instructions which run on a computer causes the computer to perform the steps of:

accessing a template comprising content elements and transaction values for use when generating a document;

accessing data associated with the template, the data representing at least one rule for making at least one determination of the use of the content elements and transaction values, and at least one mark-up rule;

receiving information enabling at least one determination to be made;

generating a partially customised document on the basis of the received information; and evaluating the at least one mark-up rules to produce an indication in the generated partially customized document of where the transaction values are missing and their effect on the generated partially customized document being produced by the document generation program, wherein the effect of the transaction values is indicated by marking up the generated partially customized document to show;

i) the name and location of a missing transaction variable;

ii) calculations involving the missing transaction variable, and iii) conditional text having a usage statement that depends on the missing transaction value.

20. The computer program product of claim 19, wherein the mark up rules indicate the information to be inserted into the generated document when a transaction value is missing or indefinite, and the information to represent any conditional text.

21. The computer program product of claim 19, wherein highlight rules are associated with transaction value names, the highlight rules specifying how to highlight a single variable or group of variables in the generated document.

22. The computer program product of claim 21, wherein the highlight rules indicate different fonts or colours for different transaction value names.

* * * * *